(12) United States Patent
Okamoto

(10) Patent No.: US 10,484,573 B2
(45) Date of Patent: Nov. 19, 2019

(54) INFORMATION PROCESSING APPARATUS, NON-TRANSITORY COMPUTER READABLE MEDIUM, AND INFORMATION PROCESSING SYSTEM

(71) Applicant: FUJI XEROX CO., LTD., Tokyo (JP)

(72) Inventor: Akira Okamoto, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/785,013

(22) Filed: Oct. 16, 2017

(65) Prior Publication Data

US 2018/0278802 A1    Sep. 27, 2018

(30) Foreign Application Priority Data

Mar. 22, 2017    (JP) .................................. 2017-055759

(51) Int. Cl.

| | | |
|---|---|---|
| *H04N 1/44* | (2006.01) | |
| *H04N 1/21* | (2006.01) | |
| *G06F 21/31* | (2013.01) | |
| *H04N 1/00* | (2006.01) | |
| *G06F 21/40* | (2013.01) | |
| *G06F 21/60* | (2013.01) | |

(52) U.S. Cl.
CPC .......... *H04N 1/4413* (2013.01); *G06F 21/31* (2013.01); *G06F 21/40* (2013.01); *G06F 21/608* (2013.01); *H04N 1/00411* (2013.01); *H04N 1/21* (2013.01); *H04N 1/4433* (2013.01); *G06F 2221/2117* (2013.01); *H04N 2201/006* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 9,509,779 B2 | 11/2016 | Yoda | |
| 2014/0122740 A1* | 5/2014 | Yoda | H04L 67/16 709/238 |

(Continued)

FOREIGN PATENT DOCUMENTS

JP    2014-90301 A    5/2014

*Primary Examiner* — Frantz Bataille
(74) *Attorney, Agent, or Firm* — Oliff PLC

(57) ABSTRACT

An information processing apparatus includes plural communication units, first and second authentication units, a selection unit, and a transmission unit. The plural communication units are connected to one or more communication lines. The first authentication unit performs user authentication by a first authentication method. The second authentication unit performs user authentication by a second authentication method. The selection unit selects, if the first authentication unit performs user authentication, a communication unit from among the plural communication units by a first method as a communication unit used for transmission of information to a terminal apparatus, or, if the second authentication unit performs user authentication, a communication unit from among the plural communication units by a second method as a communication unit used for transmission of information to the terminal apparatus. The transmission unit transmits information to the terminal apparatus by using the communication unit selected by the selection unit.

8 Claims, 5 Drawing Sheets

(56) References Cited

U.S. PATENT DOCUMENTS

| | | | |
|---|---|---|---|
| 2015/0189124 A1* | 7/2015 | Mondo | H04N 1/4426 358/1.14 |
| 2015/0205942 A1* | 7/2015 | Yang | G06F 21/31 726/19 |
| 2015/0281202 A1* | 10/2015 | Hirama | H04L 63/08 726/4 |
| 2016/0255245 A1* | 9/2016 | Ishibashi | H04N 1/4433 358/1.14 |

* cited by examiner

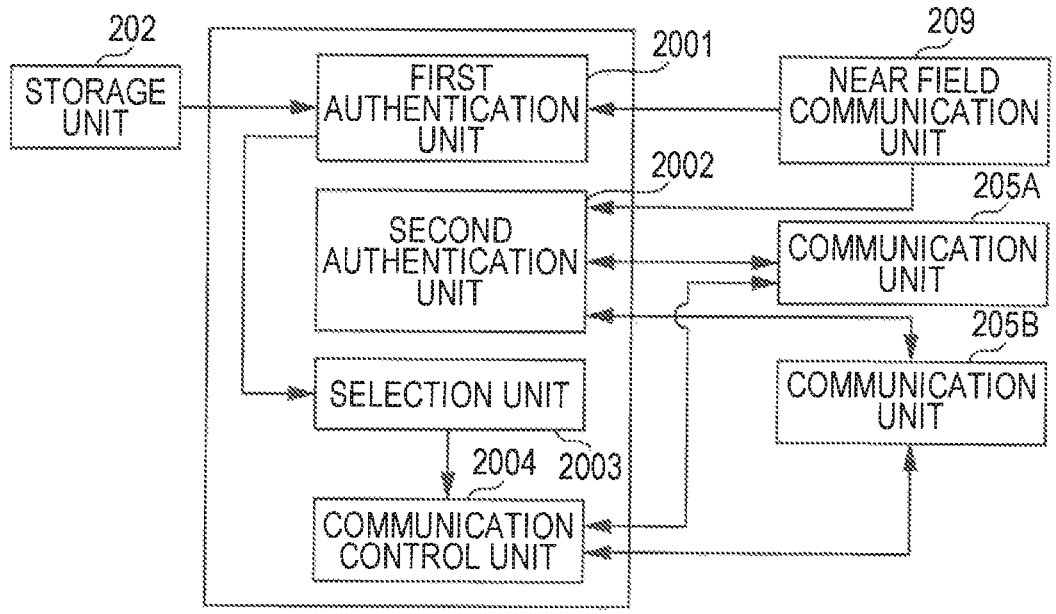

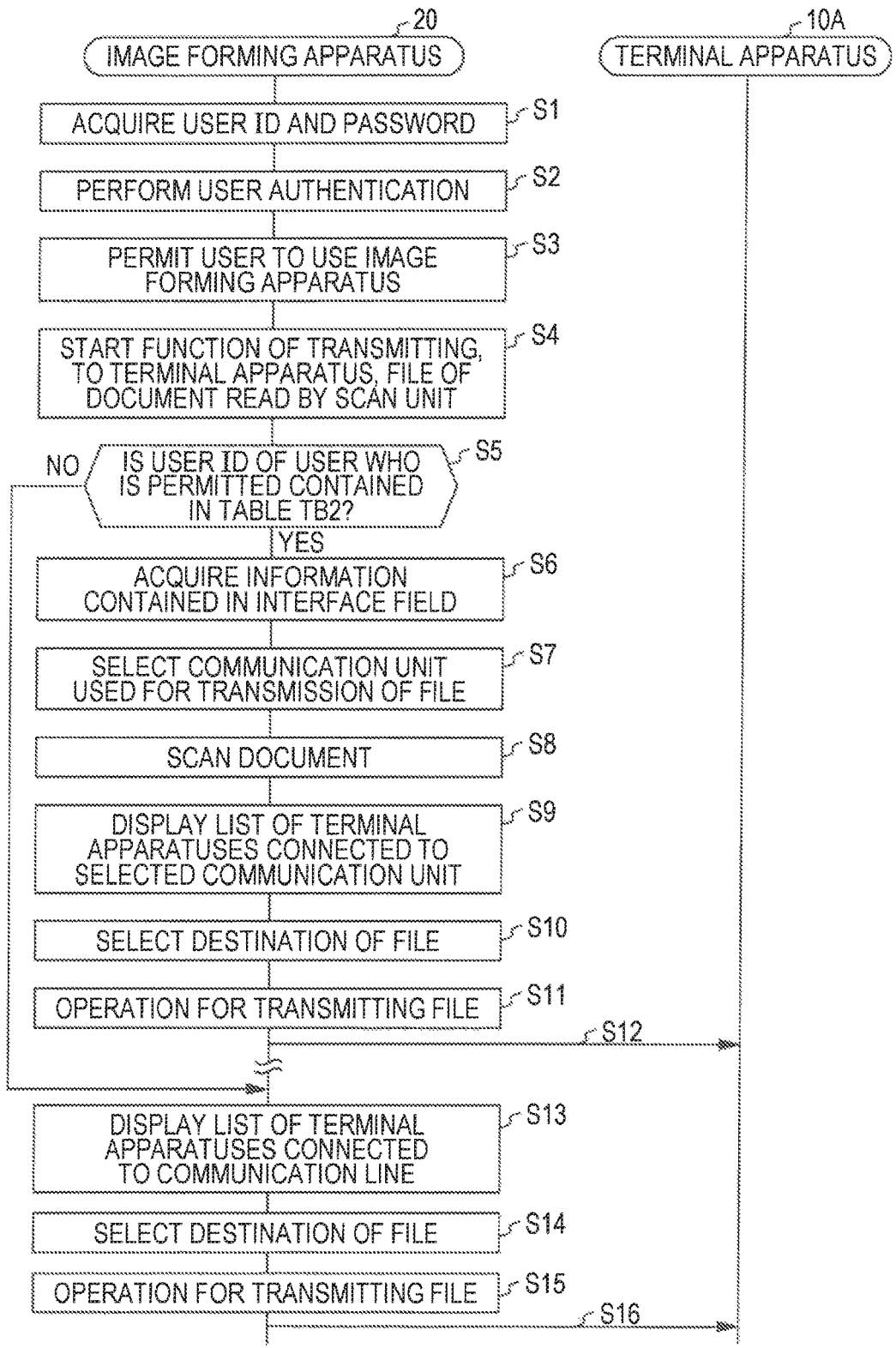

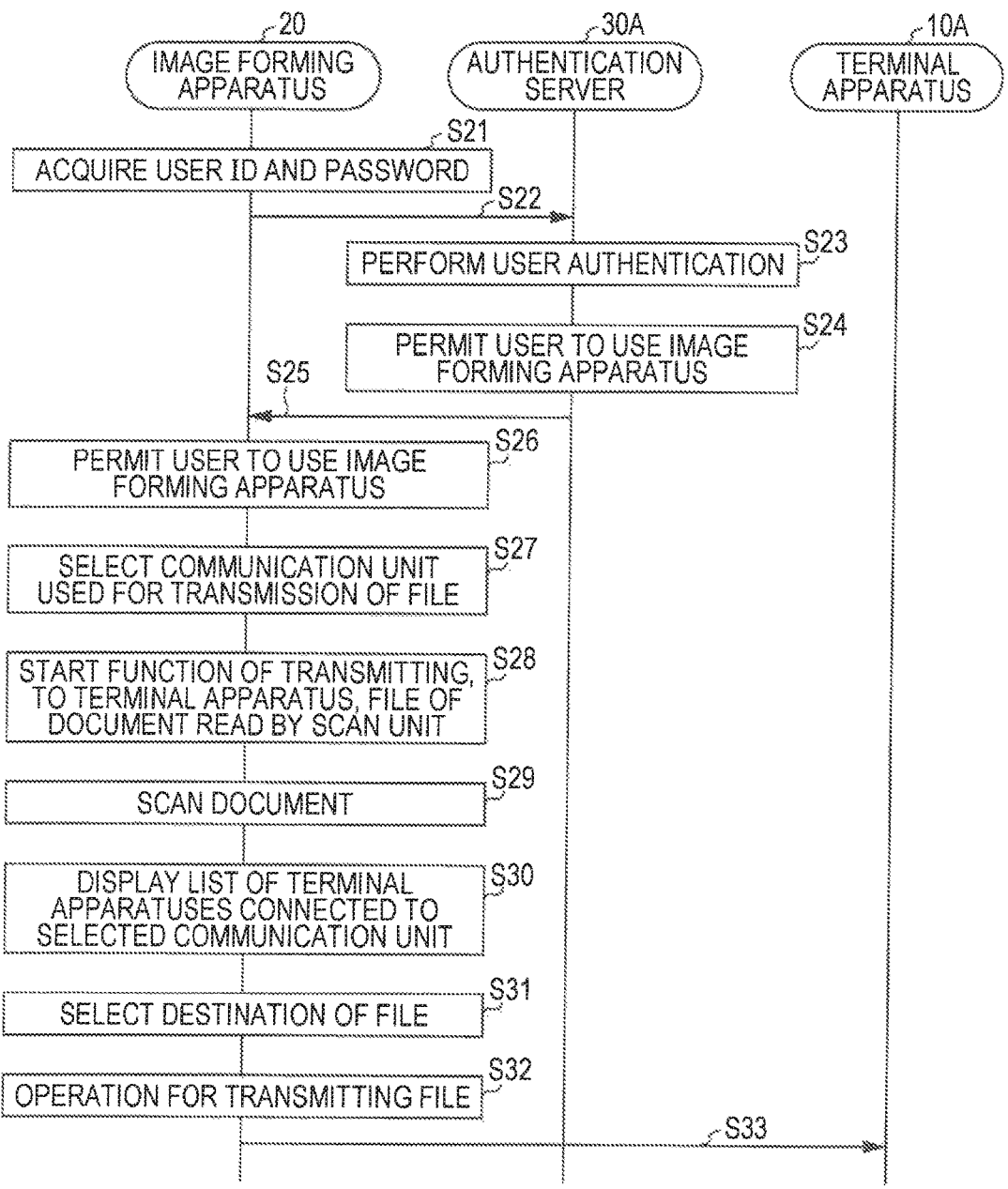

INFORMATION PROCESSING APPARATUS, NON-TRANSITORY COMPUTER READABLE MEDIUM, AND INFORMATION PROCESSING SYSTEM

CROSS-REFERENCE TO RELATED APPLICATIONS

This application is based on and claims priority under 35 USC 119 from Japanese Patent Application No. 2017-0557.59 filed Mar. 22, 2017.

BACKGROUND (i) Technical Field

The present invention relates to an information processing apparatus, a non-transitory computer readable medium, and an information processing system.

(ii) Related Art

A user is authenticated in some cases to use an information processing apparatus, and the information processing apparatus may perform user authentication or an authentication server connected to a communication line may perform user authentication. If the authentication server performs user authentication, a terminal used by the user also connected to the communication line to which the authentication server is connected.

SUMMARY

According to an aspect of the invention, there is provided an information processing apparatus including plural communication units, a first authentication unit, a second authentication unit, a selection unit, and a transmission unit. The plural communication units are connected to one or more communication lines. The first authentication unit performs user authentication by a first authentication method. The second authentication unit performs user authentication by a second authentication method. If the first authentication unit performs user authentication, the selection unit selects a communication unit from among the plural communication units by a first method as a communication unit used for transmission of information to a terminal apparatus, or, if the second authentication unit performs user authentication, the selection unit selects a communication unit from among the plural communication units by a second method as a communication unit used for transmission of information to the terminal apparatus. The transmission unit transmits information to the terminal apparatus by using the communication unit selected by the selection unit.

BRIEF DESCRIPTION OF THE DRAWINGS

An exemplary embodiment of the present invention will be described in detail based on the following figures, wherein:

FIG. 3 illustrates an exemplary table;
FIG. 4 illustrates an exemplary table;
FIG. 5 is a functional block diagram of the image forming apparatus;
FIG. 8 is a sequence diagram for illustrating an operation example;
and
FIG. 9 is a sequence diagram for illustrating an operation example.

DETAILED DESCRIPTION

Exemplary Embodiment

Overall Configuration

Figure 1:
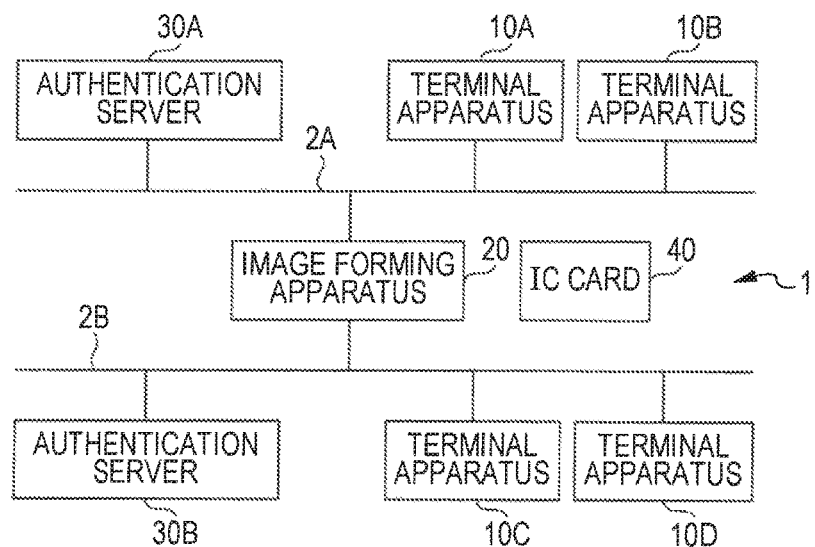
FIG. 1 illustrates apparatuses in an information processing system according to an exemplary embodiment of the present invention.

FIG. 1 illustrates apparatuses in an information processing system 1 according to an exemplary embodiment of the present invention. A communication line 2A and a communication line 2B are each a communication line for performing data communication, and plural computer apparatuses that perform data communication are connected to the communication line 2A and the communication line 2B. The communication line 2A and the communication line 2B include wired and wireless communication lines. In addition, the communication line 2A and the communication line 2B are each an independent communication line and are not connected to each other.

An image forming apparatus 20, which is an exemplary information processing apparatus according to an exemplary embodiment of the present invention, has an image forming function for forming an image on a sheet of paper, a scanning function for reading a document, a copying function, and a facsimile function. The image forming apparatus 20 is connected to the communication line 2A and the communication line 2E. The image forming apparatus 20 performs data communication by being connected to another computer apparatus through a communication line to which the image forming apparatus 20 is connected.

Terminal apparatuses 10A to 10D, each of which is an exemplary terminal apparatus according to an exemplary embodiment of the present invention, is a computer apparatus that performs data communication and is a desktop personal computer in this exemplary embodiment. The terminal apparatuses 10A and 103 are connected to the communication line 2A with wires, and the terminal apparatuses 10C and 10D are connected to the communication line 2B with wires or wirelessly. The terminal apparatuses 10A to 10D each perform data communication through a communication line to which a corresponding one of the terminal apparatuses 10A to 10D are connected. Each of the terminal apparatuses 10A to 10D is not limited to a personal computer and may be, for example, a smartphone, a tablet terminal, or a laptop personal computer. Note that the terminal apparatuses 10A to 10D have substantially the same configuration and thus will be hereinafter referred to as terminal apparatuses 10 or a terminal apparatus 10 unless being distinguished from one another.

An authentication server 30A and an authentication server 30B, each of which is an exemplary authentication apparatus according to an exemplary embodiment of the present invention, is an apparatus that performs authentication of a user who uses the image forming apparatus 20 and the terminal apparatus 10. The authentication server 30A is connected to the communication line 2A, and the authentication server 30B is connected to the communication line 2B. Note that the authentication server 30A and the authentication server 30B have substantially the same hardware configuration and thus will be hereinafter referred to as authentication servers 30 or an authentication server 30 unless being distinguished from each other.

An integrated circuit (IC) card 40 is possessed by a user who is permitted to use the image forming apparatus 20 by a manager. The IC card 40 performs communication complying with a communication system for a non-contact IC card among communication systems for near field communication (NFC). The IC card 40 stores user identifier (ID) and a password that are authentication information to be used for authentication of a user of the image forming apparatus 20.

In the information processing system 1, for example, the communication line 2A is a communication line to which terminal apparatuses 10 used by physicians in a hospital are connected, and the communication line 2B is a communication line to which terminal apparatuses 10 used by office workers in the hospital are connected. To prevent information from being leaked from a terminal apparatus 10 used by a physician to a third party other than the physicians, the communication line 2A is separated from the communication line 2B.

In the information processing system 1, when a user instructs the image forming apparatus 20 to print a document on a terminal apparatus 10, the terminal apparatus 10 transmits a file representing the document to the image forming apparatus 20, and on the basis of the file transmitted from the terminal apparatus 10, the image forming apparatus 20 prints the document. In addition, when an operation is performed on the image forming apparatus 20 for transmitting, to the terminal apparatus 10, a file representing a document that has been read by using the scanning function, the image forming apparatus 20 transmits the file representing the document to the terminal apparatus 10.

Configuration of Image Forming Apparatus 20

Figure 2:
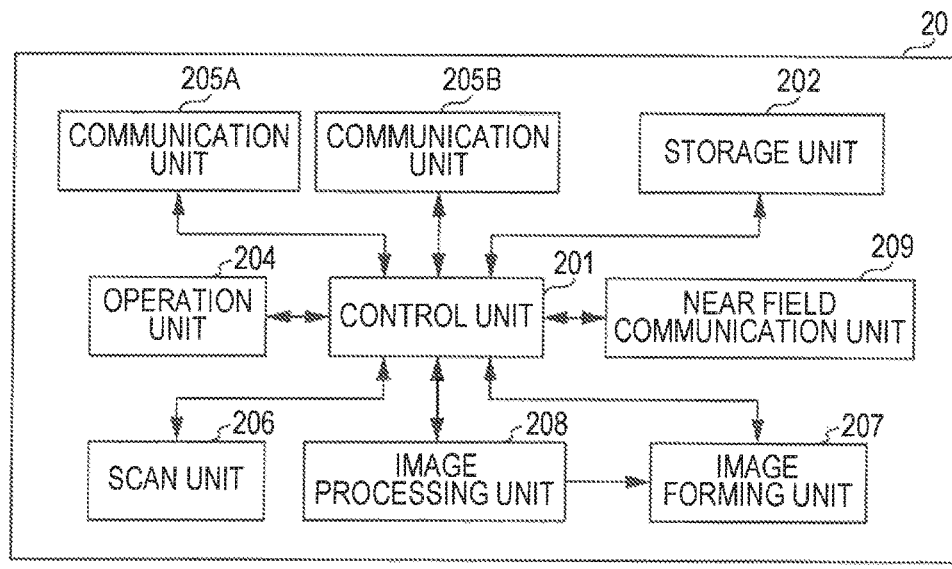
FIG. 2 is a block diagram of an exemplary hardware configuration of an image forming apparatus.

FIG. 2 illustrates an exemplary hardware configuration of the image forming apparatus 20. An operation unit 204 includes plural buttons for operating the image forming apparatus 20. The operation unit 204 further includes a touch panel obtained by combining a liquid crystal display and sensors for sensing a touch of a digit on a display surface of the liquid crystal display. The touch panel displays a GUI screen for operating the image forming apparatus 20. Although the image forming apparatus 20 includes a touch panel and a user may operate the image forming apparatus 20 by using the touch panel and buttons in this exemplary embodiment, the image forming apparatus 20 may include a liquid crystal display instead of the touch panel and may display a GUI screen on the liquid crystal display, and a user may operate the image forming apparatus 20 by using buttons.

A communication unit 205A is connected to the communication line 2A with wires or wirelessly and performs data communication with another apparatus connected to the communication line 2A. A communication unit 205B is connected to the communication line 2B with wires or wirelessly and performs data communication with another apparatus connected to the communication line 2B. The communication unit 205A and the communication unit 205B are each an exemplary communication unit according to an exemplary embodiment of the present invention.

A scan unit 206 includes an image reading device (not illustrated) that optically reads a document and generates file representing an image of the read document. An image processing unit 208 performs various kinds of processing on image data representing an image to be formed on a sheet of paper. The image processing unit 208 performs image processing such as color correction or gradation correction on an image represented by image data supplied from a control unit 201, generates, from the image subjected to image processing, image data of images in yellow, magenta, cyan, and black (YMCK), and outputs the image data to an image forming unit 207.

The image forming unit 207 forms a toner image on a sheet of paper by an electrophotographic system. Specifically, the image forming unit 207 includes an image forming unit for forming a yellow toner image, an image forming unit for forming a magenta toner image, an image forming unit for forming a cyan toner image, and an image forming unit for forming a black toner image. Each of the image forming units forms an electrostatic latent image on a photoreceptor in accordance with the image data that has been output from the image processing unit 208 and then causes toner to be affixed to the surface of the photoreceptor to form toner images in yellow, magenta, cyan, and black and transfers the toner images on a sheet of paper. The toner images transferred on the sheet of paper are fixed by heat and pressure, and then the sheet of paper on which the toner images are formed is discharged from the image forming apparatus 20. Although the image forming unit 207 forms an image on a sheet of paper by using toner in this exemplary embodiment, the image forming unit 207 may form an image on a sheet of paper by using ink for an inkjet system or the like.

A near field communication unit 209 performs communication complying with a communication system of a non-contact IC card among communication systems for NFC. The near field communication unit 209 communicates with the IC card 40 and acquires a user ID and a password that are stored in the IC card 40.

A storage unit 202 includes a storage device for permanently storing data and stores a file transmitted from another apparatus and received by the communication unit 205A or the communication unit 205B and a file generated by the scan unit 206.

In addition, the storage unit 202 stores a table TB1 containing authentication information assigned to a user who is permitted to use the image forming apparatus 20 by a manager. FIG. 3 illustrates an example of the table TB1. The table TB1 includes a user ID field and a password field. The user ID field contains user IDs assigned to users who are permitted to use the image forming apparatus 20. Each user ID is an identifier for uniquely identifying a user. The password field contains passwords assigned to the users who are permitted to use the image forming apparatus 20.

The storage unit 202 also stores a table TB2 containing the history of communication with the terminal apparatuses FIG. 4 illustrates an example of the table TB2. The table TB2 includes an address field, a user ID field, and an interface field. The address field contains internet protocol (IP) addresses of the terminal apparatuses 10 that have communicated with the image forming apparatus 20. The user ID field contains user IDs of users of the terminal apparatuses 10 that have communicated with the image forming apparatus 20. The interface field contains identifiers of communication units that have been used for communication with the terminal apparatuses 10.

For example, if the terminal apparatus 10A is to transmit a document file to the image forming apparatus 20 and the image forming apparatus 20 is to print a document represented by the transmitted file, the terminal apparatus 10A and the image forming apparatus 20 communicate each other, and the terminal apparatus 10A transmits, to the image forming apparatus 20, the document file and the user ID of a user of the terminal apparatus 10A. In this case, the communication unit 205A receives the file and the user ID. In the table TB2, the transmitted user ID is contained in the user ID field, and the IP address of the terminal apparatus 10A that has transmitted the user ID is contained in the address field. In addition, "A" representing the communication unit 205A that has received the file and the user ID is contained in the interface field. Note that if the communication unit 205B of the image forming apparatus 20 has received the file and the user ID, "B" representing the communication unit 205B is contained in the interface field.

The control unit 201 includes a central processing unit (CPU), random access memory (RAM), and memory and executes an operating system program and an application program stored in the memory. If the image forming apparatus 20 is set so as to perform user authentication, the control unit 201 authenticates a user by using the table TB1. If the image forming apparatus 20 is set such that the authentication server 30 performs user authentication, the control unit 201 authenticates a user by accessing the authentication server 30. To form an image on a sheet of paper, the control unit 201 generates image data representing the image to be formed on a sheet of paper on the basis of a file stored in the storage unit 202 and supplies the generated age data to the image processing unit 208. To transmit a file generated by the scan unit 206 to a terminal apparatus 10, the control unit 201 controls the communication unit 205A or the communication unit 205B to transmit the file generated by the scan unit 206 to the terminal apparatus 10.

FIG. 5 is a block diagram of a functional configuration according to an exemplary embodiment of the present invention among functions implemented by the image forming apparatus 20. A first authentication unit 2001, which is an example of a first authentication unit according to an exemplary embodiment of the present invention, acquires a user ID and a password that are received by the near field communication unit 209 from the IC card 40. The first authentication unit 2001 authenticates a user by using a set of the user ID and the password that are acquired and the table TB1 that is stored in the storage unit 202. A second authentication unit 2002, which is an example of a second authentication unit according to an exemplary embodiment of the present invention, acquires a user ID and a password that are received by the near field communication unit 209 from the IC card 40. The first authentication unit 2001 transmits the set of the acquired user ID and password to the authentication server 30. The second authentication unit 2002 receives a user authentication result transmitted from the authentication server 30 as a response to the set of the transmitted user ID and password and authenticates a user.

If the first authentication unit 2001 authenticates a user, a selection unit 2003, which is an example of a selection unit according to an exemplary embodiment of the present invention, selects the communication unit 205A or the communication unit 205B that has communicated with a terminal apparatus 10 that the user uses, as a communication unit that communicates with the terminal apparatus 10 that the user uses. In addition, if the second authentication unit 2002 authenticates a user, the selection unit 2003 selects the communication unit 205A or the communication unit 205E that has communicated with the authentication server 30 that has authenticated the user, as a communication unit that communicates with the terminal apparatus 10 that the user uses.

A communication control unit 2004, which is an example of a transmission unit according to an exemplary embodiment of the present invention, controls the communication unit 205A or the communication unit 205B selected by the selection unit 2003 to communicate with the terminal apparatus 10 that the user uses.

Configuration of Authentication Server 30

Figure 6:
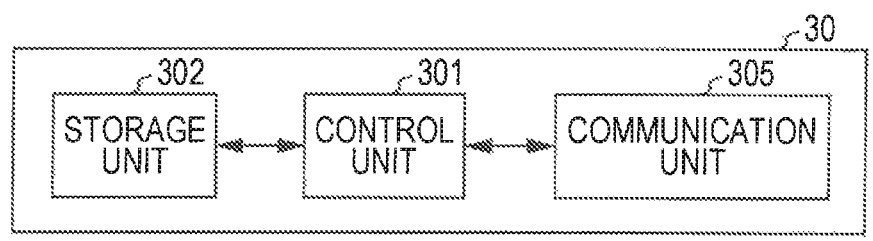
FIG. 6 is a block diagram of an exemplary hardware configuration of an authentication server.

FIG. 6 is a block diagram of an exemplary hardware configuration of the authentication server 30A and the authentication server 30B. Note that if it is necessary to distinguish parts of the authentication server 30A and parts of the authentication server 30B from each other, description will be given by adding, to the end of reference numerals of the parts of an authentication server 30, a corresponding one of the alphabetical letters at the end of the authentication servers 30 for convenience of the description. For example, "A" is added to the end of the reference numeral of each part of the authentication server 30A, and "B" is added to the end of the reference numeral of each part of the authentication server 30B.

A communication unit 305 serves as a communication interface for performing data communication. A communication unit 305A is connected to the communication line 2A, and a communication unit 305B is connected to the communication line 2B.

A storage unit 302 includes a storage device (e.g., hard disk device) that permanently stores programs executed by a control unit 301, information used by the control unit 301 executing a program, and the like. The programs stored in the storage unit 302 are an operating system program, a program for authenticating a user who uses the image forming apparatus 20 or the terminal apparatus 10, and the like. In addition, the storage unit 302 stores a table TB3 containing authentication information assigned to users who are permitted to use the image forming apparatus 20 and the terminal apparatus 10. The table TB3 has substantially the same configuration as the table TB1 and includes a user ID field and a password field.

The control unit 301 includes a CPU and RAM and executes an operating system program to control the storage unit 302 and the communication unit 305. In addition, upon a program for authenticating a user being executed, the control unit 301 acquires a user ID and a password that are transmitted from a terminal apparatus 10 or the image forming app 20 and performs a user authentication process by using the acquired user ID and the password.

Figure 7:
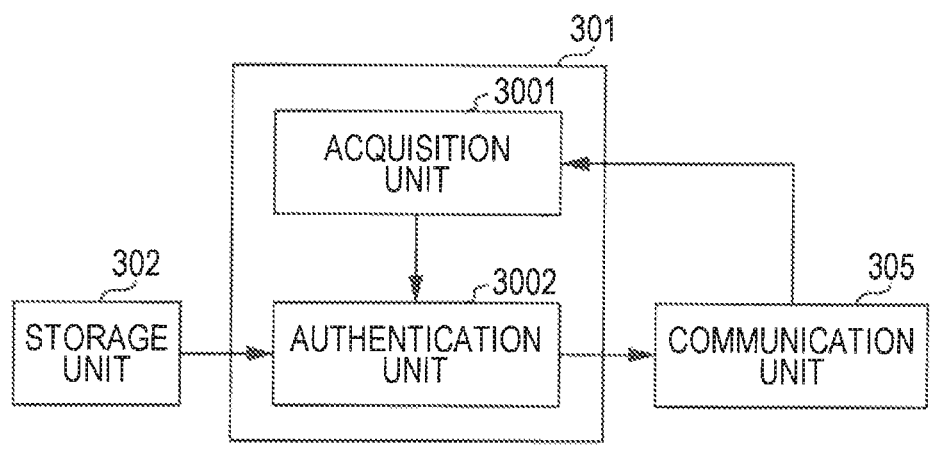
FIG. 7 is a functional block diagram of the authentication server.

FIG. 7 is a block diagram of a functional configuration according to an exemplary embodiment of the present invention among functions implemented by the authentication server 30. An acquisition unit 3001 acquires a user ID and a password that are transmitted from the image forming apparatus 20. An authentication unit 3002 performs user authentication by using a set of the user ID and the password that are acquired by the acquisition unit 3001 and the table TB3 stored in the storage unit 302. The authentication unit 3002 transmits a message indicating an authentication result to a terminal apparatus 10 that has transmitted the user ID and the password.

Operation Example of Exemplary Embodiment

FIGS. 8 and 9 are sequence diagrams for illustrating operation examples according to an exemplary embodiment of the present invention. First, an operation example in which the image forming apparatus 20 is set so as to authenticate a user who uses the image forming apparatus 20 will be described with reference to FIG. 8. Note that the operation example will be described below on the assumption that a user A has transmitted a document file from the terminal apparatus 10A to the image forming apparatus 20 to print a document, and thereby a record in the third row of the table TB2 illustrated in FIG. 4 has been generated.

To use the image forming apparatus 20, the user A puts the IC card 40 that is assigned to the user A close to the near field communication unit 209. The near field communication unit 209 communicates with the IC card 40 that the user A has put close and is connected to the IC card 40. Once the near field communication unit 209 is connected to the IC card 40, the control unit 201 controls the near field communication unit 209 to acquire a user ID and a password stored in the IC card 40 (step S1).

The control unit 201 performs user authentication by using the acquired user ID and password (step S2). Specifically, the control unit 201 determines whether the same set of a user ID and a password as a set of the user ID and the password acquired from the IC card 40 is contained in the table TB1. If the same set of the user ID and the password as the set of the user ID and the password acquired from the IC card 40 is contained in the table TB1, the control unit 201 permits user A to use the image forming apparatus 20 (step S3). If the control unit 201 permits the user A to use the image forming apparatus 20, the user A becomes able to use the image forming apparatus 20 by operating the operation unit 204.

To use a function of transmitting, to the terminal apparatus 10A, a file representing a document that has been read by the scan unit 206, the user A issues an instruction for implementing this function by operating the operation unit 204. The control unit 201 starts the function in accordance with the user operation (step S4). If the image forming apparatus 20 is set so as to perform user authentication, upon the function being started, the control unit 201 determines whether the table TB2 contains the user ID of the user A who is permitted to use the image forming apparatus 20 (step S5).

If the table TB2 contains the user ID of the user A who is permitted to use the image forming apparatus 20 (YES in step S5), the control unit 201 acquires information contained in the interface field of the record containing the user ID (step S6). For example, since "user A", which is the user the user A, is contained in the record in the third row of the table TB2 in FIG. 4, the control unit 201 acquires "A", which is information contained in the interface field of the record in the third row.

If the information acquired from the interface field is "A", the control unit 201 selects the communication unit 205A as a communication unit 205 to be used when transmitting a file (step S7). Note that, if the information acquired from the interface field is "B", the control unit 201 selects the communication unit 205B as a communication unit 205 to be used when transmitting a file.

Upon the communication unit 205 to be used when transmitting a file being selected, the control unit 201 starts to scan a document that is set in the scan unit 206 (step S8). When the scan unit 206 reads the document, a file representing an image of the read document is stored in the storage unit 202.

When the file representing an image of the read document is stored in the storage unit 202, the control unit 201 controls a touch panel of the operation unit 204 to display a list of terminal apparatuses 10 that are connected to the selected communication unit 205A (step S9). For example, if the control unit 201 has selected the communication unit 205A as the communication unit 205 to be used when transmitting a file, the terminal name of the terminal apparatus 10A and the terminal name of the terminal apparatus 10B that are connected to the communication line 2A are displayed on the touch panel.

The user A performs an operation for selecting, from among the displayed terminal names, the terminal name of the terminal apparatus 10A that the user A uses, as the destination of the file (step S10). When the user A performs an operation for issuing an instruction for transmitting the file (step S11) after selecting the terminal name, the control unit 201 controls the communication unit 205A to transmit the file representing an image of the read document to the terminal apparatus 10A having the selected terminal name (step 12).

Note that, if the table TB2 does not contain the user ID of the user A who is permitted to use the image forming apparatus 20, the control unit 201 controls the touch panel to display a list of terminal apparatuses 10 that are connected to the communication line 2A and a list of terminal apparatuses 10 that are connected to the communication line 2B (step S13). The user A selects, from among the terminal names displayed on the touch panel, the terminal name of the terminal apparatus 10A that the user A uses, as the destination of the file (step S14). When the user A performs an operation for issuing an instruction for transmitting the file (step S15) after selecting the terminal name, the control unit 201 controls the communication unit 205A that connected to the communication line 2A to which the terminal apparatus 10A is connected and transmits, to the terminal apparatus 10A having the selected terminal name, the file representing an image of the read document (step S16).

Next, an operation example in which the image forming apparatus 20 is set such that the authentication server 30 performs user authentication will be described with reference to FIG. 9. To use the image forming apparatus 20, the user A puts the IC card 40 that is assigned to the user A close to the near field communication unit 209. The near field communication unit 209 communicates with the IC card 40 that the user A has put close and is connected to the IC card 40. Once the near field communication unit 209 is connected to the IC card 40, the control unit 201 controls the near field communication unit 209 to acquire a user ID and a password stored in the IC card 40 (step S21).

If the setting is provided in such a manner that the authentication server 30 performs user authentication, first, the control unit 201 controls the communication unit 205A to transmit, to the authentication server 30A, a set of the user ID and the password that are acquired from the IC card 40 (step S22). The authentication server 30A performs user authentication by using the user ID and the password transmitted from the image forming apparatus 20 (step S23). Specifically, a control unit 301A determines whether the table TB3 contains the same set of a user ID and a password as the set of the user ID and the password transmitted from the image forming apparatus 20. If table TB3 contains the same set of the user ID and the password as the set of the user ID and the password transmitted from the image forming apparatus 20, the authentication server 30A permits the user A to use the image forming apparatus 20 (step S24). If the authentication server 30A permits the user A to use the image forming apparatus 20, a message indicating the Permission to use the image forming apparatus 20 is transmitted to the image forming apparatus 20 (step S25).

Upon the message indicating the permission to use the image forming apparatus 20 being received by the communication unit 205A, the control unit 201 permits the user A to use the image forming apparatus 20 (step S26). If the control unit 201 permits the user A to use the image forming apparatus 20, the user A becomes able to use the image forming apparatus 20 by operating the operation unit 204. In addition, if the control unit 201 permits the user A to use the image forming apparatus 20, the control unit 201 selects, as a communication unit 205 to be used when communication is performed by an operation performed by the user A, the communication unit 205A that has received the message indicating the permission to use the image forming apparatus 20 (step 7).

To use a function of transmitting, to the terminal apparatus 10A, a file representing a document that has been read by the scan unit 206, the user A issues an instruction for implementing this function by operating the operation unit 204. The control unit 201 starts this function in response to a user operation (step S28). If the authentication server 30 is set so as to perform user authentication, upon the function being started, the control unit 201 starts to scan a document that is set in the scan unit 206 (step S29). When the scan unit 206 reads the document, a file representing an image of the read document is stored in the storage unit 202.

When the file representing an image of the read document is stored in the storage unit 202, the control unit 201 controls a touch panel to display a list of terminal apparatuses 10 that are connected to the communication unit 205A selected in step S27 (step S30). For example, if the control unit 201 has selected the communication unit 205A as the communication unit 205 to be used when transmitting a file, the terminal name of the terminal apparatus 10A and the terminal name of the terminal apparatus 10B connected to the communication line 2A are displayed on the touch panel.

The user A performs an operation for selecting, from among the displayed terminal names, the terminal name of the terminal apparatus 10A that the user A uses, as the destination of the file (step S31). When the user A performs an operation for issuing an instruction for transmitting the file (step S32) after selecting the terminal name, the control unit 201 controls the communication unit 205A to transmit the file representing an image of the read document to the terminal apparatus 10A having the selected terminal name (step S33).

Modifications

Although the exemplary embodiment of the present invention has been described above, the present invention is not limited to the above-described exemplary embodiment and may be implemented in various other manners. For example, the above exemplary embodiment may be modified in the following manners to implement the present invention. Note that the above exemplary embodiment and any of the following modifications may be combined.

First Modification

In a first modification of the present invention, in a case in which a setting is provided such that the image forming apparatus 20 performs authentication of a user who uses the image forming apparatus 20, if the table TB2 contains plural records containing the user ID of the authenticated user and in addition, one or more of the plural records contain "A" in the interface field and one or more of the plural records contain "B" in the interface field, the image forming apparatus 20 may display a list of terminal apparatuses 10 connected to the communication line 2A and a list of terminal apparatuses 10 connected to the communication line 2B, and the terminal name of a terminal apparatus 10 as the destination of the file may be selected. In this case, the image forming apparatus 20 selects, as the communication unit 205 to be used for transmission of a file, a communication unit 205 connected to a communication line to which the terminal apparatus 10 selected by the user is connected.

Second Modification

In a second modification of the present invention, if both the authentication server 30A and the authentication server 30B are capable of performing authentication of a single user who uses the image forming apparatus 20, the image forming apparatus 20 may display a list of terminal apparatuses 10 connected to the communication line 2A and a list of terminal apparatuses 10 connected to the communication line 2B, and a user may select the terminal name of a terminal apparatus 10 as the destination of a file.

In this case, for example, the image forming apparatus 20 transmits a user ID and a password that are acquired from the IC card 40 to both the authentication server 30A and the authentication server 30B. If a message indicating the permission to use the image forming apparatus 20 is transmitted from both the authentication server 30A and the authentication server 30B, as described above, the image forming apparatus 20 displays a list of terminal apparatuses 10 connected to the communication line 2A and a list of terminal apparatuses 10 connected to the communication line 2B. The image forming apparatus 20 selects, as a communication unit 205 used for transmission of the file, a communication unit 205 connected to a communication line to which the terminal apparatus 10 selected by the user from the list is connected.

Third Modification

In a third modification of the present invention, when a file is transmitted from the image forming apparatus 20 to a terminal apparatus 10, the method for transmitting the file may be selected from among plural methods. For example, a user may select, as the method for transmitting the file, any of a method using the File Transfer Protocol (FTP), a method using Server Message Block (SMB), and a method using email. In a configuration in which a user may select the method for transmitting the file, available transmission methods may be set for each of the plural communication units 205. For example, the communication unit 205A may be set so as to be capable of using the FTP, SMB, and email when transmitting the file, and the communication unit 205B may be set so as to be capable of using SMB and email when transmitting the file. In addition, in a configuration in which available file transmission methods are set for each of the communication units 205, when a user selects a transmission method from a list of file transmission methods that are displayed, unavailable transmission methods may be grayed out.

Fourth Modification

In a fourth modification of the present invention, each user who may use the image forming apparatus 20 may be authenticated by a different method. In this modification, for example, the control unit 201 that has acquired a user ID and a password from the IC card 40 first transmits the user ID and the password to the authentication server 30A. If the communication unit 205A receives a message indicating the permission to use the image forming apparatus 20 transmitted from the authentication server 30A, the control unit 201 selects the communication unit 205A as the communication unit 205 to be used when communication is performed by a user operation.

If the communication unit 205A receives a message indicating the non-permission to use the image forming apparatus 20 transmitted from the authentication server 30A, the control unit 201 transmits a user ID and a password to the authentication server 303. If the communication unit 205B receives a message indicating the permission to use the image forming apparatus 20 transmitted from the authentication server 30B, the control unit 201 selects the communication unit 205B as the communication unit 205 to be used when communication is performed by a user operation.

If the communication unit 205B receives a message indicating the non-permission to use the image forming apparatus 20 transmitted from the authentication server 30B, the control unit 201 determines whether the table TB1 contains a set of the user ID and the password that are acquired from the IC card 40. If the table TB1 contains the same set of the user ID and the password as the set of the user ID and the password that are acquired from the IC card 40, the control unit 201 permits the user A to use the image forming apparatus 20. If the user is authenticated in this manner by using the table TB1, the control unit 201 selects the communication unit 205 to be used when communication is performed by a user operation, by using the table TB2 as in the above-described exemplary embodiment.

Note that, if the authentication server 30 attempts to authenticate a user and does not authenticate the user, the control unit 201 attempts to authenticate the user by using the table TB1 in the above modification. However, the modification is not limited to this configuration. For example, first, if authentication using the table TB1 is attempted and then a user is not authenticated by the authentication process using the table TB1, one of the authentication server 30A and the authentication server 30B is selected, and the authentication process is performed by using the selected authentication server 30. Then, if the user is not authenticated by the selected authentication server 30, the other authentication server 30 may perform an authentication process.

Fifth Modification

Although the number of the communication units 205 is two in the above-described exemplary embodiment, the number of the communication units 205 may be three or more.

Sixth Modification

Although the control unit 201 acquires a user ID and a password from the IC card 40 in the above-described exemplary embodiment, a user may input the user ID and the password by using the touch panel or buttons of the operation unit 204, and the user ID and the password that have been input by the user on the operation unit 204 may be acquired.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a plurality of communication interfaces that are connected to one or more communication lines;
a memory that stores first authentication information to be used for user authentication;
a near field communication interface that receives second authentication information from an integrated circuit (IC) card;
a central processing unit (CPU) programmed to:
perform user authentication by a first authentication method,
wherein, in the first authentication method, the user authentication is performed by comparing the first authentication information stored in the memory to the second authentication information received from the IC card;
transmit the second authentication information received from the IC card to an authentication server;
perform user authentication by a second authentication method,
wherein, in the second authentication method, the user authentication is performed by using a user authentication result transmitted from the authentication server;
if the user authentication is performed by the first authentication method performs user authentication, select a communication interface from among the plurality of communication interfaces by a first method as a communication interface used for transmission of information to a terminal apparatus, or, if the user authentication is performed by the second authentication method, select a communication interface from among the plurality of communication interfaces by a second method as a communication interface used for transmission of information to the terminal apparatus;
transmit information to the terminal apparatus by using the selected communication interface; and
if a user is not authenticated by the second authentication method, control to display a list of terminal apparatuses that are connected to each of the plurality of communication interfaces for user selection of a terminal apparatus for transmission of the information to the terminal apparatus selected by the user.

2. The information processing apparatus according to claim 1, wherein, if a user is not authenticated in the user authentication performed by the first authentication method, the user authentication is performed by the second authentication method.

3. The information processing apparatus according to claim 1, wherein, if a user is not authenticated in the user authentication performed by the second authentication method, the user authentication is performed by the first authentication method.

4. The information processing apparatus according to claim 1,
wherein, in the first method, a communication interface that has communicated with a terminal apparatus used by a user authenticated by the first authentication method is selected as the communication interface used for transmission of information to the terminal apparatus from among the plurality of communication interfaces, and wherein, in the second method, a communication interface that is connected through a communication line to the authentication server that has authenticated the user is selected as the communication interface used for transmission of information to the terminal apparatus from among the plurality of communication interfaces.

5. The information processing apparatus according to claim 2, wherein, in the first method, a communication interface that has communicated with a terminal apparatus used by a user authenticated by the first authentication method is selected as the communication interface used for transmission of information to the terminal apparatus from among the plurality of communication interfaces, and wherein, in the second method, a communication interface that is connected through a communication line to the authentication server that has authenticated the user is selected as the communication interface used for transmission of information to the terminal apparatus from among the plurality of communication interfaces.

6. The information processing apparatus according to claim 3, wherein, in the first method, a communication interface that has communicated with a terminal apparatus used by a user authenticated by the first authentication method is selected as the communication interface used for transmission of information to the terminal apparatus from among the plurality of communication interfaces, and wherein, in the second method, a communication interface that is connected through a communication line to the authentication server that has authenticated the user is selected as the communication interface used for transmission of information to the terminal apparatus from among the plurality of communication interfaces.

7. A non-transitory computer readable medium storing a program causing a computer to execute a process for information processing, the process comprising:

connecting a plurality of communication interfaces to one or more communication lines;

storing in a memory first authentication information to be used for user authentication;

receiving, by a near field communication interface, second authentication information from an integrated circuit (IC) card;

performing user authentication by a first authentication method, wherein, in the first authentication method, the user authentication is performed by comparing the first authentication information stored in the memory to the second authentication information received from the IC card;

transmitting the second authentication information received from the IC card to an authentication server;

performing user authentication by a second authentication method, wherein, in the second authentication method, the user authentication is performed by using a user authentication result transmitted from the authentication server;

if a user is authenticated by the first authentication method, selecting a communication interface from among the plurality of communication interfaces by a first method as a communication interface used for transmission of information to a terminal apparatus, or, if a user is authenticated by the second authentication method, selecting a communication interface from among the plurality of communication interfaces by a second method as a communication interface used for transmission of information to the terminal apparatus;

transmitting information to the terminal apparatus by using the selected communication interface; and if a user is not authenticated by the second authentication method, controlling to display a list of terminal apparatuses that are connected to each of the plurality of communication interfaces for user selection of a terminal apparatus for transmission of the information to the terminal apparatus selected by the user.

8. An information processing system comprising:

an information processing apparatus including:

a plurality of communication interfaces that are connected to one or more communication lines;

a memory that stores first authentication information to be used for user authentication;

a near field communication interface that receives second authentication information from an integrated circuit (IC) card;

a central processing unit (CPU) programmed to:

perform user authentication by a first authentication method, wherein, in the first authentication method, the user authentication is performed by comparing the first authentication information stored in the memory to the second authentication information received from the IC card;

transmit the second authentication information received from the IC card to an authentication server;

perform user authentication by a second authentication method, wherein, in the second authentication method, the user authentication is performed by using a user authentication result transmitted from the authentication server;

if the user authentication is performed by the first authentication method, select a communication interface from among the plurality of communication interfaces by a first method as a communication interface used for transmission of information to a terminal apparatus, or, if the user authentication is performed by the second authentication method, select a communication interface from among the plurality of communication interfaces by a second method as a communication interface used for transmission of information to the terminal apparatus;

transmit information to the terminal apparatus by using the selected communication interface; and if a user is not authenticated by the second authentication method, control to display a list of terminal apparatuses that are connected to each of the plurality of communication interfaces for user selection of a terminal apparatus for transmission of the information to the terminal apparatus selected by the user; and a terminal apparatus that receives the transmitted information.

* * * * *